(12) United States Patent
Modave et al.

(10) Patent No.: US 8,411,504 B2
(45) Date of Patent: Apr. 2, 2013

(54) LIMITATION OF THE ACCESS TO A RESOURCE OF AN ELECTRONIC CIRCUIT

(75) Inventors: Jean-Louis Modave, Ottignies (BE); Thierry Huque, Ramillies (BE)

(73) Assignee: Proton World International N.V., Zaventem (BE)

( * ) Notice: Subject to any disclaimer, the term of this patent is extended or adjusted under 35 U.S.C. 154(b) by 357 days.

(21) Appl. No.: 12/521,769

(22) PCT Filed: Jan. 4, 2008

(86) PCT No.: PCT/EP2008/050073
§ 371 (c)(1), (2), (4) Date: Feb. 10, 2011

(87) PCT Pub. No.: WO2008/084017
PCT Pub. Date: Jul. 17, 2008

(65) Prior Publication Data
US 2011/0122694 A1 May 26, 2011

(30) Foreign Application Priority Data
Jan. 5, 2007 (FR) ..................... 07 52552

(51) Int. Cl.
*G11C 11/34* (2006.01)
(52) U.S. Cl. .................. 365/185.04; 365/201
(58) Field of Classification Search ............. 365/185.04, 365/201
See application file for complete search history.

(56) References Cited

U.S. PATENT DOCUMENTS

| | | | |
|---|---|---|---|
| 3,906,460 A | 9/1975 | Halpern |
| 4,028,733 A | 6/1977 | Ulicki |
| 4,211,919 A | 7/1980 | Ugon |
| 4,484,067 A | 11/1984 | Obrecht |
| 4,734,568 A | 3/1988 | Watanabe |

(Continued)

FOREIGN PATENT DOCUMENTS

| WO | WO 98/29813 A | 7/1998 |
|---|---|---|
| WO | WO 9956253 A | 11/1999 |

(Continued)

OTHER PUBLICATIONS

International Search Report dated Apr. 14, 2008, from International Application No. PCT/EP2008/050074.

(Continued)

*Primary Examiner* — Son Dinh
*Assistant Examiner* — Nam Nguyen
(74) *Attorney, Agent, or Firm* — Wolf, Greenfield & Sacks, P.C.

(57) ABSTRACT

A method and a circuit for controlling the access to at least one resource of an electronic circuit, in which a test of the value of a counter over at least one bit conditions the access to the resource, the counter being automatically reset after a time period independent from whether the circuit is powered or not.

30 Claims, 8 Drawing Sheets

U.S. PATENT DOCUMENTS

| | | |
|---|---|---|
| 4,983,816 A | 1/1991 | Iijima |
| 5,465,349 A | 11/1995 | Geronimi et al. |
| 6,188,309 B1 | 2/2001 | Levine |
| 6,356,126 B1 * | 3/2002 | Anderson et al. ............ 327/151 |
| 7,258,271 B2 | 8/2007 | Vidal |
| 7,330,979 B1 | 2/2008 | Hazard |
| 7,496,738 B2 | 2/2009 | Modave |
| 7,516,902 B2 | 4/2009 | Modave |
| 7,660,169 B2 | 2/2010 | Otterstedt et al. |
| 7,739,520 B2 | 6/2010 | Horvat et al. |
| 7,962,760 B2 | 6/2011 | Ferren et al. |
| 8,036,020 B2 | 10/2011 | La Rosa |
| 2001/0010331 A1 | 8/2001 | Hazard |
| 2003/0005315 A1 | 1/2003 | Horvat et al. |
| 2004/0078589 A1 | 4/2004 | Giraud |
| 2005/0135411 A1 | 6/2005 | Sureaud |
| 2006/0112436 A1 | 5/2006 | Modave |
| 2007/0220603 A1 | 9/2007 | Chamberot |
| 2010/0020648 A1 | 1/2010 | La Rosa |
| 2010/0027334 A1 | 2/2010 | La Rosa |
| 2010/0054024 A1 | 3/2010 | La Rosa |
| 2010/0054038 A1 | 3/2010 | La Rosa |
| 2011/0007567 A1 | 1/2011 | Modave et al. |
| 2011/0010775 A1 | 1/2011 | Modave et al. |

FOREIGN PATENT DOCUMENTS

| | | |
|---|---|---|
| WO | WO 2004029873 A1 | 4/2004 |

OTHER PUBLICATIONS

International Search Report dated Apr. 15, 2008, from International Application No. PCT/EP2008/050072.

English Translation of Written Opinion of the International Searching Authority from International Application No. PCT/EP2008/050073.

English Translation of Written Opinion of the International Searching Authority from International Application No. PCT/EP2008/050074.

English Translation of Written Opinion of the International Searching Authority from International Application No. PCT/EP2008/050072.

International Search Report dated Apr. 14, 2008, from corresponding International Application No. PCT/EP2008/050073.

* cited by examiner

Fig 17A  Fig 17B  Fig 17C

LIMITATION OF THE ACCESS TO A RESOURCE OF AN ELECTRONIC CIRCUIT

CROSS REFERENCE TO RELATED APPLICATIONS

This application claims the priority benefit of French patent application number 07/52552, filed on Jan. 5, 2007, entitled "Limitation of Access to a Resource of an Electronic Circuit," which is hereby incorporated by reference to the maximum extent allowable by law.

BACKGROUND OF THE INVENTION

1. Field of the Invention

The present invention generally relates to electronic circuits and, more specifically, to the protection of information contained in an electronic circuit or the circulation of which is controlled by this circuit. "Information" designates any type of data that is not to be communicated in uncontrolled fashion, be they contained in the circuit (for example, access codes, passwords, storage addresses, specific steps of algorithms, etc.) or external to the circuit but with said circuit controlling their availability (for example, ciphered data, broadcast media contents, etc.).

A first aspect relates to the protection of data contained in an electronic circuit against fraud attempts aiming at discovering the data supposed to remain secret.

Another aspect relates to the control, by means of an electronic circuit, of the communication or of the use of information contained in the circuit or in an appended device.

The present invention will be described hereafter in relation with an example of application to an electronic circuit of a smart card, but it more generally applies to any electronic circuit containing information with a controlled circulation or conditioning the circulation of information with a controlled circulation, be the circuit on a smart card, isolated, or assembled on an electronic board of a more complex device.

2. Discussion of the Related Art

According to one aspect, when an electronic circuit is capable of manipulating information which are supposed to remain secret, it may be equipped with software and/or hardware mechanisms of detection and protection against different attack attempts aiming at hacking these data. The protection mechanisms (countermeasures) against attacks distribute between those which scramble the manipulation of the critical information (for example, by injection of random numbers) and those which try to detect attack attempts to block the information or the circuit. All such mechanisms have the disadvantage of lengthening the information processing time as compared with a lack of protection.

Further, they require that the circuit to be powered to operate. On the one hand, this generates non-productive power consumption. On the other hand, this enables a person attempting fraud to bypass some countermeasures by cutting-off the circuit power supply (for example, by abruptly extracting the smart card from the reader).

According to another aspect which relates to the control, by means of an electronic circuit, of the communication or of the use of information, ciphering/deciphering units are difficult to protect. This results in a weakness of the system since the same unit can then be used by several receivers. For example, it is enough for an authentic smart card forming an access unit to be made available on-line by its owner over the Internet for several users to request at the same time on-the-fly decipherings via the Internet. The increase in available Internet throughputs and the use of the Internet for the broadcasting of digital contents have increased the vulnerability of such systems.

It would be desirable to be able to control the access to the deciphering circuit resources to prevent such frauds.

More generally, it would be desirable to be able to control the access to resources of an electronic circuit, be it to avoid frauds or for any other reason (for example, limiting the number and/or the duration of use of the resources). "Resource" is used to designate any software or hardware application of the circuit (for example, a ciphering algorithm, a program of a circuit application, etc.) as well as any information stored or manipulated by the circuit (for example, a ciphering circuit, an authentication code, etc.).

SUMMARY OF THE INVENTION

At least one embodiment of the present invention aims at overcoming all or part of the disadvantages of mechanisms for protecting information contained in an electronic circuit or controlled by such a circuit.

According to one aspect, an embodiment aims at an information protection mechanism which avoids use of attack detections or other countermeasures, while being compatible with the existence of such countermeasures.

An embodiment of another aspect aims at the control, by a circuit, of the accessibility of information that it contains or contained in another device.

More generally and according to another aspect, an embodiment aims at a control of the time access to resources of an electronic circuit.

An embodiment provides controlling the access to one or several resources of an electronic circuit by limiting the number and/or the duration of access to this resource.

An embodiment aims at enabling a control which remains efficient, even when the control circuit is not powered.

An embodiment also aims at a solution compatible with current integrated circuit and EEPROM manufacturing technologies.

To achieve all or part of these objects, as well as others, at least one embodiment of the present invention provides a method for controlling the access to at least one resource of an electronic circuit, in which a test of the value of a counter over at least one bit conditions the access to the resource, the counter being automatically reset after a time period independent from whether the circuit is powered or not.

According to an embodiment, said counter is incremented or decremented on each access to the resource.

According to an embodiment, said counter is over several bits, the result of said test being provided directly by the state of one of the bits.

According to an embodiment, the access to said resource is blocked in case of a detection of a number of past accesses greater than a threshold, the blocking being definitive or temporary, of a duration independent from whether the circuit is powered or not.

According to an embodiment, the blocking duration ranges between one day and three months.

According to an embodiment, the counter is set at the first access to the resource or to order.

According to an embodiment, the counter is provided in the form of at least one charge retention circuit comprising at least one first capacitive element exhibiting a leakage through its dielectric space.

According to an embodiment, a switching of a bit of said counter to an active state is caused by an injection or extraction of charges into or from said first capacitive element.

According to an embodiment, the method is applied to limiting the frequency of use of a secret quantity of the circuit.

According to an embodiment, the method is applied to the protection of the secret quantity.

According to an embodiment, the method is applied to the control of the access to a resource of the circuit enabling exploiting the content of another support.

According to an embodiment, the method is applied to the providing of temporary authorizations of use of a program or of data.

An embodiment provides an electronic circuit capable of implementing the method and in which the or each charge retention circuit comprises:

at least one first capacitive element having a first electrode connected to a floating node;

at least one second capacitive element having a first electrode connected to the floating node, the second capacitive element having a greater capacitance than the first one; and at least one first transistor with an insulated control gate connected to said floating node.

According to an embodiment, at least one third capacitive element has a first electrode connected to said floating node and a second electrode connectable to a voltage source.

According to an embodiment, the circuit is implanted in an array of EEPROM-type memory cells each comprising a selection transistor is series with a floating-gate transistor, and in which on a same row of memory cells where the respective floating gates of the cell transistors are interconnected:

the first capacitive element comprises a first subset of at least one first cell where the thickness of the dielectric of the tunnel window of the floating gate transistor is smaller than that of the other cells;

the second capacitive element comprises a second subset of at least one second cell where the drain and the source of the floating-gate transistor are interconnected;

the third capacitive element comprises a third subset of at least one third cell; and the first transistor comprises a fourth subset of at least one fourth cell having its tunnel window suppressed.

The foregoing and other objects, features, and advantages of the present invention will be discussed in detail in the following non-limiting description of specific embodiments in connection with the accompanying drawings.

DETAILED DESCRIPTION

The same elements have been designated with the same reference numerals in the different drawings.

For clarity, only those elements and steps which are useful to the understanding of the present invention have been shown in the drawings and will be described hereafter. In particular, the resources used by an electronic circuit according to the present invention have not been detailed, the present invention being compatible with any current use of a hardware or software resource. The mechanisms of data communication between the electronic circuit and its environment have not been detailed either, the present invention being here again compatible with usual mechanisms.

Figure 1:
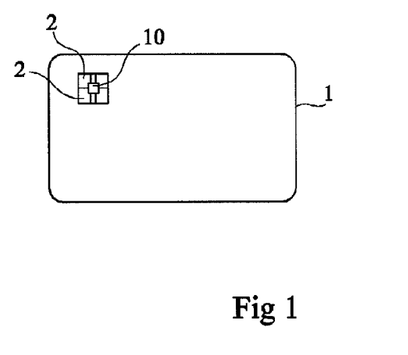
FIG. 1 shows a smart card of the type to which the present invention applies as an example.

FIG. 1 schematically shows a smart card 1 of the type to which the present invention applies as an example. Such a card is formed of a support, generally made of plastic matter, on or in which are embedded one or several electronic circuits 10. Circuit 10 is capable of communicating with a terminal by means of contacts 2 and/or without contact (radioelectric transmission or transmission by modulation of an electromagnetic field of a terminal).

Figure 2:
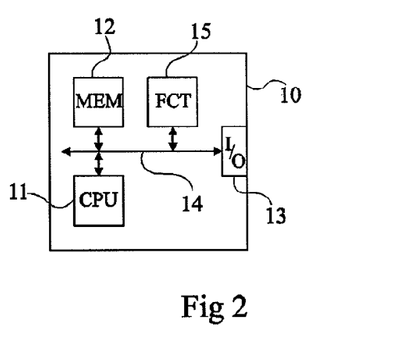
FIG. 2 shows an electronic circuit of the type to which the present invention applies as an example.

FIG. 2 very schematically shows in the form of blocks an electronic circuit 10 (for example, of a smart card 1 of FIG. 1) of the type to which the present invention applies as an example. Circuit 10 comprises, among others, a digital processing unit 11 (for example, a central processing unit—CPU), one or several memories 12 (MEM) among which at least one non-volatile memory (for example, of EEPROM type) and one input/output circuit (I/O) 13 for communicating with the outside of the circuit (for connection with contacts 2 or with an antenna). The different elements internal to the circuit communicate together and with interface 13 over one or several data, address, and control buses 14, as well as over possible direct connections between some of these elements. Circuit 10 may also integrate other software or hardware functions. These functions have been symbolized by a block 15 (FCT) in FIG. 2.

Figure 3:
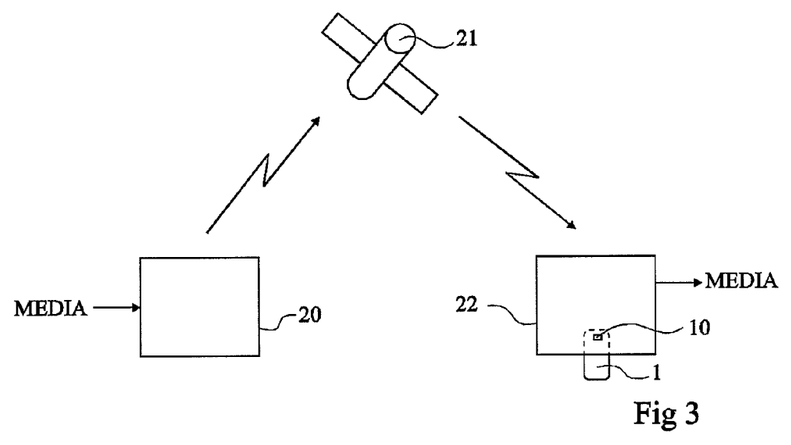
FIG. 3 illustrates a system to which the present invention applies as an example.

FIG. 3 very schematically illustrates in the form of blocks a broadcasting system to which another aspect applies as an example.

This example relates to the satellite broadcasting of digital media. On the side of broadcaster 20, digital content MEDIA (possibly at the same time or after digital coding of an analog content) is ciphered by means of a key prior to its broadcasting, for example via a satellite 21. On the receive side, a decoder 22 has the function, not only of converting the signals to make them interpretable (for example, by converting them into video signals), but also of deciphering the data by means of a key contained, for example, in a smart card 1 dedicated to each user. Decoder 22 and deciphering circuit 10 (often called conditional access module or CAM) are generally separate. Further, for efficiency reasons, circuit 10 should be capable of rapidly processing a great number of deciphering requests.

According to a first aspect, in the case of an attack of an integrated circuit to discover a secret thereof, the person attempting to fraud repeats the attack a great number of times until he obtains the information that he wants. Further, this repeating is performed within a relatively short time interval so that the attack can be profitable to him. For example, it can be considered that a differential power analysis attack requires tens of thousands of measurements to be exploitable. However, the normal use of a key in the lifetime of a product generally does not exceed some hundred uses per day.

According to another aspect, in the case of a use of a same deciphering module by several users in parallel, it can here be considered that the use of the resource (the deciphering key or the deciphering program) too many times indicates a fraudulent use.

A difference between a normal use of a resource and a use likely to be fraudulent is the (average) frequency of use.

It could thus be envisaged to count the number of uses of a resource of an electronic circuit over a given time to detect a fraudulent behavior.

A problem which remains is that an electronic circuit is not necessarily permanently powered and, in most cases, does not contain a battery enabling to operate a time counter, so that such a time measurement can be a problem. Further, even if it has a battery, said battery is capable of being discharged (intentionally or not).

Figure 4:
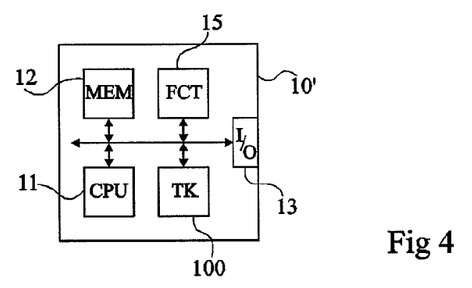
FIG. 4 very schematically shows in the form of blocks an embodiment of an electronic circuit.

FIG. 4 very schematically shows in the form of blocks, in a view to be compared with that of FIG. 2, an embodiment of an electronic circuit 10'.

As previously, circuit 10' comprises a central processing unit 11 (CPU) likely to control its operation, be it in hardware and/or in software fashion, one or several memories 12 (MEM) among which at least one reprogrammable non-volatile memory, one input/output circuit 13 (I/O), and various hardware and software functions symbolized by a block 15 (FCT) depending on the application.

According to this embodiment, circuit 10' also comprises at least one charge retention circuit 100 (TK) having its charge level varying along time, event when circuit 10' is not powered.

Detailed examples of circuits 100 will be described hereafter in relation with FIG. 8 et seq. For the time being, it should only be noted that a circuit 100 is capable of being programmed or activated (placed in a state arbitrarily designated as 1) by injection or extraction of charges in a capacitive element which exhibits a leakage through its dielectric space, so that its active state disappears (the element switches back to state 0) after a given time, independently from the possible power supply of the circuit.

Such a charge retention circuit stores at least one state conditioning the access to a protected resource of electronic circuit 10'.

Figure 5:
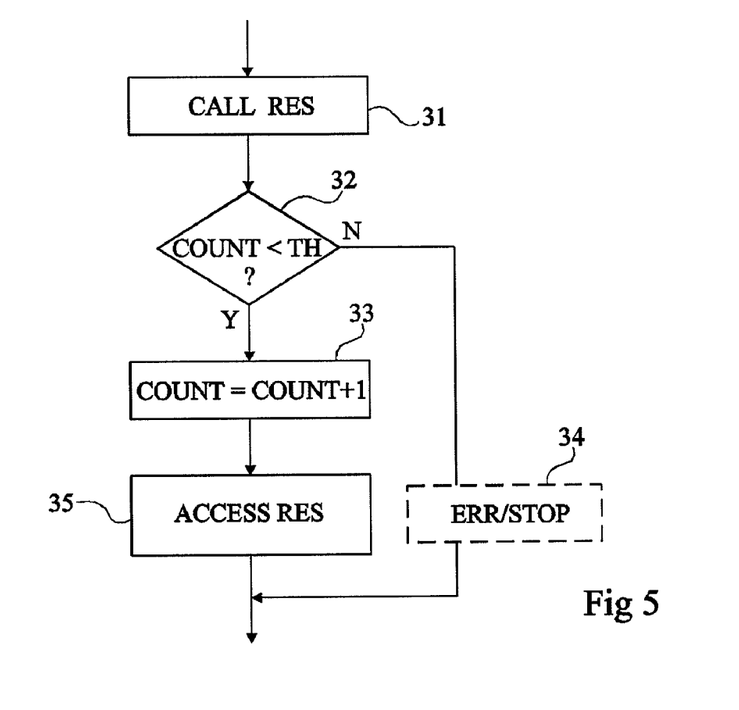
FIG. 5 is a simplified functional diagram of an embodiment of the access control method.

FIG. 5 illustrates, in a simplified functional diagram, an embodiment of a first phase of an access control mechanism.

On each call to a protected resource (block 31), the state of a counter COUNT is first verified against a threshold TH (block 32, COUNT<TH?). Counter COUNT represents the number of detected malfunctions stored in the charge retention circuit(s) 100 of circuit 10'.

If threshold TH is not reached by the counter (output Y of block 32), the counter is incremented (block 33, COUNT=COUNT+1), then the access to the resource is authorized (block 35, ACCESS RES).

If the number of accesses exceeds the threshold (output N of block 32), the access to the resource is denied. For example, the control mechanism directly passes on to the processing subsequent to the use of the resource or implements an error processing (block 34 in dotted lines, ERR/STOP), or even a temporary or definitive blocking of the resource or of the circuit.

Due to the use of a charge retention circuit having its activated state disappearing after a given time, counter COUNT automatically resets, independently from the powering of electronic circuit 10'. Accordingly, it is now possible to limit the number of accesses to a resource over a given period.

Of course, instead of incrementing counter COUNT, it is possible to initialize the counter at limiting number TH, to decrement it and to detect when it reaches zero.

Taking the first aspect, the use of a first key too many times over a given period, set by the charge retention capacity of the counter bits, results in a temporary or definitive blocking as soon as the threshold has been exceeded.

A definitive blocking may be obtained by the usual mechanisms following an attack detection. A temporary blocking can be obtained by the activation of an additional circuit 100 having a sufficiently long retention time (for example, between one week and three months) to discourage a person attempting to fraud. The key then becomes accessible again at the end of this period.

Even in the case where the exceeding of the threshold does not result in a definitive blocking but in a temporary blocking, a possible person attempting to fraud is discouraged for a time period relatively long with respect to the advantage that he is likely to take of it.

An advantage of this first aspect is that it is a countermeasure against non-invasive or semi-invasive attacks. Indeed, all these attacks generally require a great number of tries. In the extreme case, all other countermeasures can be eliminated (including those introducing random numbers in the calculations). It however remains compatible with such other countermeasures.

Taking the example of ciphered communications decodable by means of an equipped circuit unit, a simultaneous or too frequent use of the deciphering algorithm or of its key will rapidly block the access to the deciphering. The blocking may be definitive or temporary. In this last case, the duration (for example, between one day and one month) is selected according to the normal acceptable frequency of use of the resource.

Figure 6:
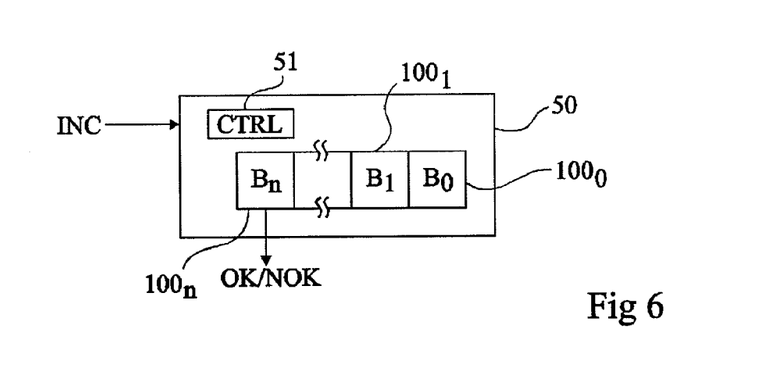
FIG. 6 schematically shows in the form of blocks an embodiment of an access counter.

FIG. 6 very schematically shows in the form of blocks an example of a counting circuit 50 containing n electronic charge retention circuits $100_0, 100_1, \ldots, 100_n$, each storing a bit $B_0, B_1, \ldots, B_n$ of counter COUNT. Circuit 50 is preferably controlled by an internal circuit 51 (CTRL) causing, as will be better understood hereafter in relation with FIG. 8 et seq., the counter incrementation after a malfunction has been detected (input INC of block 50), as well as the reading of the state of one or several bits of the counter.

In the example illustrated in FIG. 6, it is assumed that the bit $B_n$ of highest rank defines threshold TH. Indeed, a state switching of this bit represents an overflow with respect to count $2^{n-1}-1$. The reading of this single bit is then enough to provide a signal OK/NOK indicative of the result of test 32 (FIG. 5).

An advantage of such a comparison by overflow is that it makes a same hardware embodiment of circuit 50 versatile. Indeed, threshold TH can then be easily adapted whatever the number of structural bits of counter 50 by selecting that of the counter bits to be taken into account to provide result OK/NOK of test 32.

Different thresholds may be selected according to the type of resource, the access to which is requested.

According to another aspect, the access control is used to limit a number of uses of a resource (for example, a program or a content of a storage support) within a given time. In this case, the counter is set to a number corresponding to the number of authorized uses, then decremented on each use. The first one of the two limits between the time and the number blocks the use of the resource.

Figure 7:
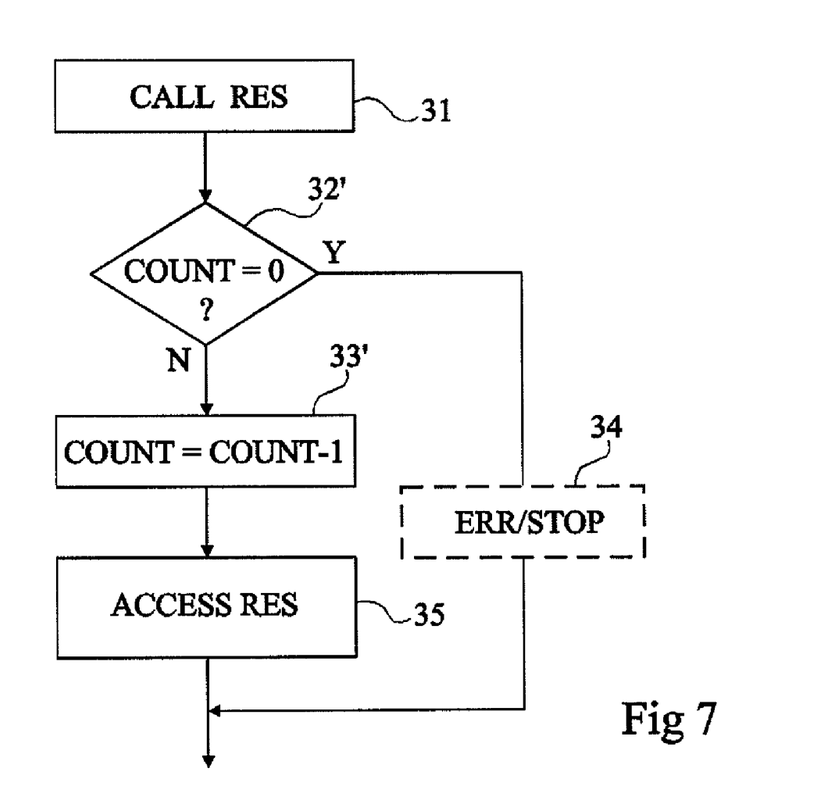
FIG. 7 is a simplified functional diagram of another embodiment of the access control method.

FIG. 7 is a simplified functional diagram illustrating an embodiment according to this other aspect.

When the circuit is made available, at the first use, or on a reset forced by an intentional activation action (for example, by a card reading and rented digital media terminal), etc., counter COUNT is set to a limiting value. This value sets not only the number of uses (number of activated bits of the counter), but also the maximum duration of use. As a variation, different counters are formed with retention capacities different from one another, which enables selecting the authorized duration of use.

The access control is performed on each call (block 31, CALL RES) to a resource (RES) of the circuit, whether this call originates from the actual circuit or from an external device.

On each call to the resource, it is started by comparing the state of counter COUNT with zero (block 32', COUNT=0?).

If the result is positive (output Y of block 32'), the access to the resource is denied. This access denial remains as long as the counter is not reactivated to value TH.

Otherwise (output N of block 32'), the counter is decremented (block 33', COUNT=COUNT−1), then the access to the resource is authorized (block 35).

In a simplified embodiment, a single circuit 100 is used (counter over a single bit or flag). According to whether step 33' is provided or not, the number of uses is at most one or is not limited. The maximum time of use however remains limited by the charge retention capacity of circuit 100.

The example of FIG. 5 finds many applications requiring an automatic time countdown, independent from the circuit power supply. For example:
- the limiting of the number of uses of an electronic transport ticket (of electromagnetic transponder type) within a given time period;
- the provision of temporary software use time-limited licenses;
- the use of temporary ciphering keys;
- the limiting of the reading permissions of multimedia supports (ciphered content if the support is inert—CD DVD—or direct limitation if the support is active and can thus contain circuits 100—flash memory, for example);
- the limiting of the validity of information relative to a user, be it to force a renewal of this information (periodically renew the biometric references of a person, for example) or to avoid an uncontrolled broadcasting;
- etc.

An advantage is to limit the number of accesses to a resource while taking time into account.

Another advantage is to enable an automatic (FIG. 5 with no blocking) or controllable (FIG. 7) reactivation of the protected resource.

In the case of a counter over several bits, the provided solution is compatible with the usual countermeasures (for example, a definitive blocking) of the electronic circuit in case of an exhaustion of the resources.

The different aspects (key protection, use limitation) and embodiments may be combined.

Figure 8:
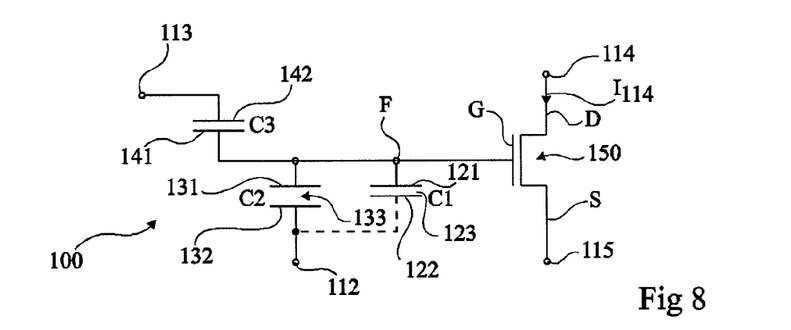
FIG. 8 shows an embodiment of an electronic charge retention circuit.

FIG. 8 shows a preferred example of a charge retention circuit 100.

Circuit 100 comprises a first capacitive element C1 having a first electrode 121 connected to a floating node F and having its dielectric space 123 designed (by its permittivity and/or by its thickness) to exhibit non-negligible leakages along time. "Floating node F" is used to designate a node not directly connected to any diffused region of the semiconductor substrate in which circuit 100 (and circuit 10') is preferentially formed and, more specifically, separated by a dielectric space from any voltage-application terminal. Second electrode 122 of capacitive element C1 is either connected (dotted lines in FIG. 2) to a terminal 112 intended to be connected to a reference voltage (for example, the ground), or left floating.

A second capacitive element C2 has its first electrode 131 connected to node F and a second electrode 132 connected to terminal 112. Capacitive C2 exhibits a charge retention capacitance greater than that of capacitive element C1.

Preferably, a third capacitive element C3 has a first electrode 141 connected to node F and a second electrode 142 connected to a terminal 113 of circuit 100, intended to be connected to a supply source on initialization of a charge retention phase (activation of the stored bit to state 1).

A function of capacitive element C2 is to store an electric charge. A function of capacitive element C1 is to discharge relatively slowly storage element C2 (as compared with a direct connection of its electrode 131 to ground) due to a leakage through its dielectric space. The presence of capacitive element C2 enables dissociating the charge level present in circuit 100 from the discharge element (capacitance C1). The thickness of the dielectric of element C2 is greater than that of element C1. The capacitance of element C2 is greater, preferably by a ratio of at least 10, than that of element C2.

A function of capacitive element C3 is to enable a charge injection into capacitive element C2 by Fowler-Nordheim effect or by a hot electron injection phenomenon. Element C3 enables avoiding the stress on element C1 on charge of elements C2 and C1 in parallel. The thickness of the dielectric space of element C3 is greater than that of element C1, to avoid introducing a parasitic leakage path.

Node F is connected to a gate G of a transistor with an insulated control terminal (for example, a MOS transistor 150) having its conduction terminals (drain D and source S) connected to output terminals 114 and 115 to measure the residual charge contained in element C2 (neglecting the capacitance of element C1 in parallel). For example, terminal 115 is grounded and terminal 114 is connected to a current source (not shown) enabling the current-to-voltage conversion of drain current $I_{114}$ in transistor 150.

The thickness of the gate dielectric of transistor 150 is greater than that of the dielectric of element C1 to avoid introducing an additional leakage on node F. Preferably, the gate thickness of transistor 150 is even greater than the thickness of the dielectric of element C3, to avoid introducing a parasitic programming path (of injection or extraction of charges into or from node F).

The interpretation of the stored level can be performed simply by means of a comparator, the switching of which is performed as long as the charge of node F remains sufficient. The level for which the comparator switches then defines the state-switching level of the bit stored by element 100. Other read solutions may be envisaged, for example, a multiple-level interpretation in an embodiment where circuit 100 directly stores several bits.

Figure 9:
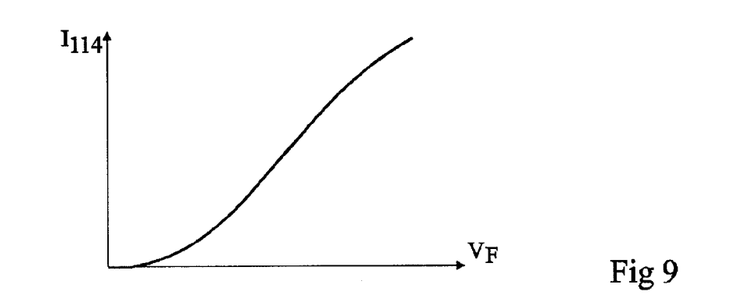
FIG. 9 is a current-vs.-voltage plot illustrating the operation of the circuit of FIG. 8.

FIG. 9 shows an example of the shape of drain current $I_{114}$ of transistor 150 according to voltage $V_F$ at node F, referenced with respect to terminal 115. Voltage $V_F$ then expresses the gate-source voltage of transistor 150. It depends on the residual charge across capacitances C1 and C2 in parallel, and thus essentially on the residual charge in capacitance C2. The evaluation of drain current $I_{114}$ may be performed by maintaining terminals 112 and 115 at the same voltage (for example, the ground) and by applying a known voltage on terminal 114.

Figure 10:
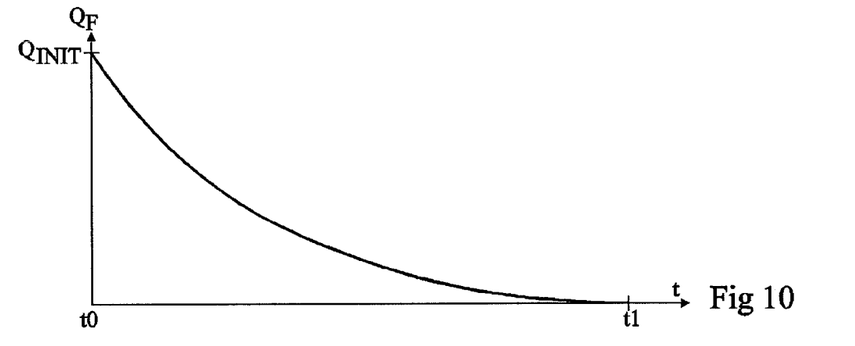
FIG. 10 is a timing diagram illustrating the operation of the circuit of FIG. 8.

FIG. 10 illustrates the variation of charge $Q_F$ at node F along time. At a time t0 when a supply (programming) voltage stops being applied on terminal 113, charge $Q_F$ starts from an initial value $Q_{INIT}$ to cancel at a time t1 with a capacitive discharge variation. The time interval between times t0 and t1 not only depends on the leakage capacitance of the dielectric of element C1, but also on the value (and thus on the storage capacitance) of element C2 which conditions value $Q_{INIT}$.

Assuming that terminals 112 and 115 and second electrode 122 of capacitive element C1 are at reference voltages and that terminal 114 is biased to a level determined so that a variation of current $I_{114}$ only originates from a variation of the voltage at node F, this variation then only depends on the time elapsed since time t0. This result is, in the illustrated embodiment, obtained due to the dissociation performed between the time leakage element (C1) and the element representative of the residual charge (C2).

The programming or activation of circuit 100 (switching to state 1 of the stored bit) through capacitive element C3 protects capacitive element C1 which has a relatively thin oxide (dielectric) thickness, which would otherwise risk being damaged in the programming. This especially enables making the measurements reliable and reproducible along time.

Several capacitive elements C3 are connected in parallel between terminal 113 and node F to accelerate the programming time.

Similarly, the retention time may be adapted not only by setting the thicknesses and/or the permittivities of the dielectrics of elements C1 and C2, but also by providing several elements C1 and/or C2 in parallel.

Figure 11:
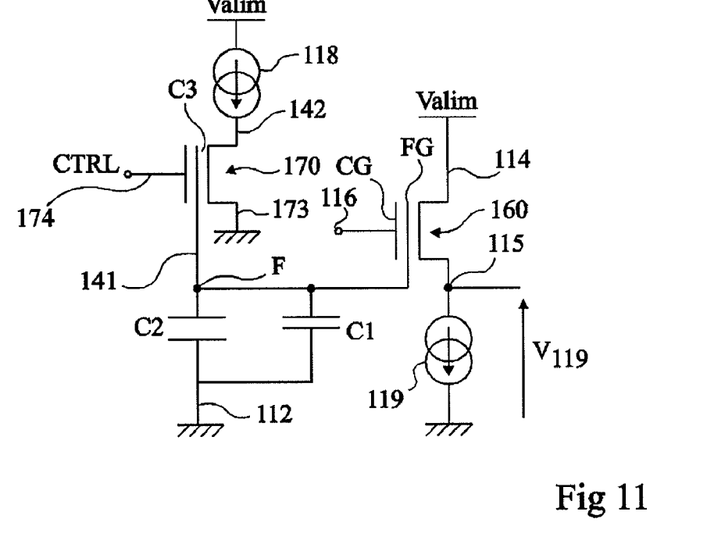
FIG. 11 shows another embodiment of a charge retention circuit in an example of environment.

FIG. 11 shows the electric diagram of another embodiment of a charge retention circuit 100'.

As compared with the embodiment of FIG. 8, transistor 150 is replaced with a transistor 160 with a floating gate FG connected to node F. Control gate CG of transistor 160 is connected to a terminal 116 for controlling the reading of the residual charge in circuit 100' (and thus of the state of the stored bit). The dielectric thickness, between floating gate FG and the channel (active area) of transistor 160, is greater than that of element C1 and preferentially greater than that of element C3.

Another difference is that charge injection or extraction element C3 is a floating-gate MOS transistor 170. Floating gate 141 of transistor 170 is connected to node F.

In the example of FIG. 11, the circuit has been shown in part of its environment. Drain 142 of transistor 170 is connected to a current source 118 receiving a supply voltage Valim and its source 173 is grounded. Its control gate 174 receives a control signal CTRL intended to turn on transistor 170 when charges need to be injected. The drain (terminal 114) of transistor 160 receives supply voltage Valim and its source is grounded by a current source 119 (inverted variation with respect to the embodiment described in relation with FIG. 8). Voltage $V_{119}$ across current source 119 is representative of the voltage at node F and is used to switch the output of a comparator (not shown).

Figure 12:
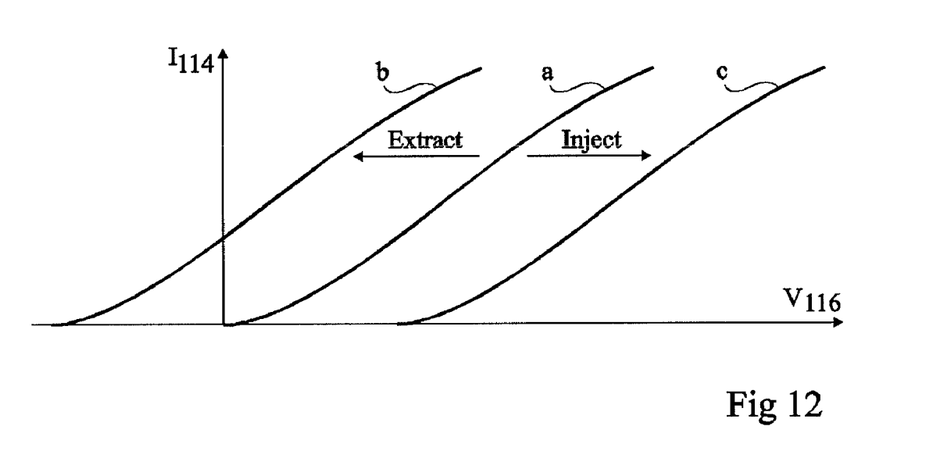
FIG. 12 is a current-vs.-voltage plot illustrating the operation of the circuit of FIG. 11.

FIG. 12 illustrates, in a plot of current $I_{114}$ versus voltage $V_{116}$ applied on the control gate, the operation of the circuit of FIG. 11. For explanation needs, it is assumed that the voltage between drain terminal 114 and source terminal 115 of transistor 160 is maintained constant by the external read circuit. The voltage drop between the floating gate and terminal 115 then depends on the electric charge present at node F, on the total capacitance between nodes F and 112 (essentially capacitances C1 and C2), and on the voltage applied on control gate 116 of transistor 160. In FIG. 12, three curves a, b, and c have been illustrated. Curve a shows the case where node F is fully discharged. Curve b shows the case of a positive charge present on node F (electron extraction). The threshold of transistor 160 is then lowered. Curve c shows the case of a negative charge on node F (electron injection), which generates a higher threshold for MOS transistor 160.

According to the applications, charges may be injected onto or extracted from node F to modify the characteristic of transistor 160 from curve a to one of curves b and c. Once isolated from the programming voltage, the leakage of capacitance C1 enables returning along time to curve a. A measurement of current $I_{114}$ (and thus of voltage $V_{119}$) for a zero voltage $V_{116}$ enables detecting an expiry of the time (resetting of the bit to zero) when current $I_{114}$ becomes zero.

After, an extraction of electrons (application on terminal 113 of an activation or programming voltage positive with respect to terminal 112) by Fowler-Nordheim effect is assumed. The operation which will be described however easily transposes to an injection of electrons at node F, for example, by a so-called hot carrier phenomenon by applying adapted voltages between terminals 142, 173, and 174.

Different voltages may be used in programming and in read mode provided to have an exploitable reference between the residual charge and the interpretation of the state of the stored bit.

According to a specific example of embodiment, a charge retention circuit is formed with the following values:
 Capacitance C1: 2 fF, dielectric thickness: 40 Å;
 Capacitance C2: 20 fF, dielectric thickness: 160 Å;
 Capacitance C3: 1 fF, dielectric thickness: 80 Å.

Such a circuit can be reset by application of a voltage on the order of 12 volts and is discharged after approximately one week. It is of course an example only, the dielectric thicknesses and the possible parallel association of several elements C1 or C2 conditioning the charge retention time.

FIGS. 13A, 13B, 13C, 14A, 14B, 14C, 15A, 15B, 15C, 16A, 16B, 16C, 17A, 17B, and 17C show an example of a circuit 100' according to the embodiment of FIG. 11 in an integrated structure, derived from an EEPROM memory architecture.

Figure 13A:
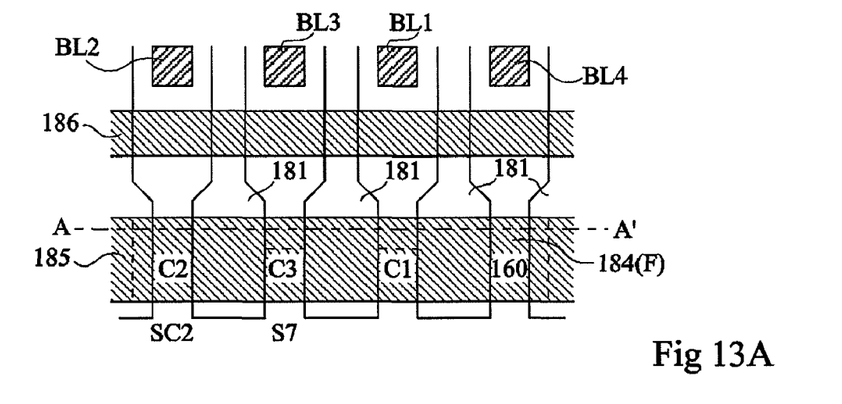
FIGS. 13A, 13B, and 13C respectively are a top view, a cross-section view along a first direction and the equivalent electric diagram of an embodiment of an electronic charge retention circuit based on EEPROM cells.
Figure 13B:
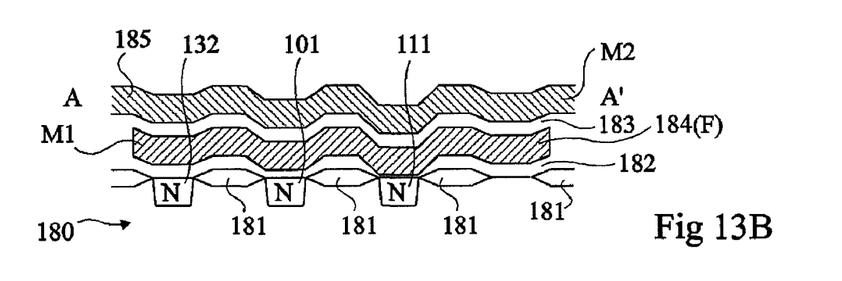

FIGS. 13A, 14A, 15A, 16A, and 17A are simplified top views, respectively, of the electronic charge retention circuit and of its elements C2, 170, C1, and 160. FIG. 13B is a cross-section view along line AA' of FIG. 13A. FIGS. 14B, 15B, 16B, and 17B respectively are cross-section views along lines BB' of FIGS. 14A, 15A, 16A, and 17A. FIGS. 13C, 14C, 15C, 16C, and 17C show the respective equivalent electric diagrams of the electronic charge retention circuit and of its elements C2, 170, C1, and 160.

An embodiment with N-channel transistors in a P-type silicon substrate 180 (FIG. 13B) is assumed. The inverse is of course possible.

Each element or cell C2, 170, C1, or 160 is obtained from a floating-gate transistor series-connected with a single-gate selection transistor T2, T3, T1, or T4 to select, for example from an EEPROM cell array network, the electronic charge retention circuit.

The floating gates of the different transistors forming elements C2, 170, C1, and 160 are interconnected (conductive line 184) to form floating node F. Their control gates are connected together to a conductive line 185 for applying read control signal CG. Their respective sources SC2, S7, SC1, and S6 are interconnected to terminal 112 (the ground) and their respective drains DC2, D7, DC1, and D6 are connected to the respective sources of selection transistors T2, T3, T1, and T4.

The gates of transistors T1 to T4 are connected together to a conductive line 186 of application of a selection signal SEL of the circuit. Their respective drains D1 to D4 are connected to individually-controllable bit lines BL1 to BL4. The order of the bit lines in FIG. 13C has been arbitrarily illustrated as BL2, BL3, BL1, and BL4 but the order of the different elements C2, 170, C1, and 160 in the horizontal direction of the rows (in the orientation of the drawings) is indifferent.

In this example of embodiment, N-type source and drain regions separated from one another in the line direction by insulating areas 181 are assumed (FIG. 13B). The floating gates are formed in a first conductive level M1 separated from the active regions by an insulating level 182 and the control gates are formed in a second conductive level M2 separated from the first one by a third insulating level 183. The gates of the selection transistors are formed, for example, in level M2.

A difference with respect to a usual EEPROM cell network is that the floating gates are interconnected by groups of four transistors to form floating node F. Another difference is that the floating-gate transistors forming the different circuit elements differ from one another by the thickness of their tunnel window and/or their drain and source connection.

Figure 14A:
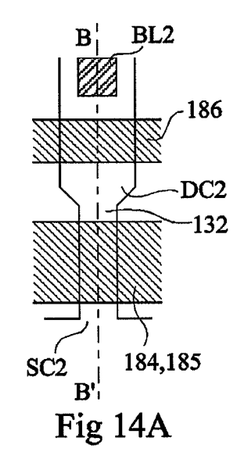
FIGS. 14A, 14B, and 14C respectively are a top view, a cross-section view along a second direction and the equivalent electric diagram of a first element of the circuit of FIGS. 13A to 13C.
Figure 14B:
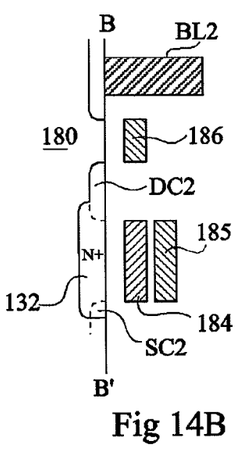
Figure 14C:
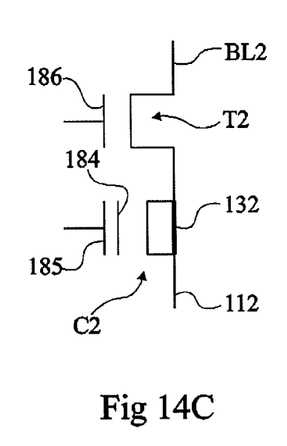

FIGS. 14A to 14C illustrate the forming of storage capacitor C2. Drain DC2 and source SC2 of the corresponding floating-gate transistor are short-circuited (by extension of the N$^+$-type implantation across the entire active area, FIG. 14B) to form electrode 132 of the capacitor. Further, the tunnel window is eliminated with respect to a standard EEPROM cell.

Figure 15A:
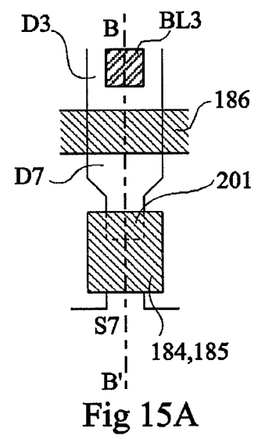
FIGS. 15A, 15B, and 15C respectively are a top view, a cross-section view along the second direction, and the equivalent electric diagram of a second element of the circuit of FIGS. 13A to 13C.
Figure 15B:
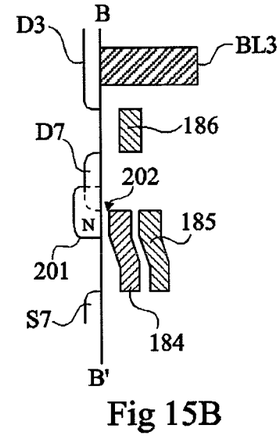
Figure 15C:
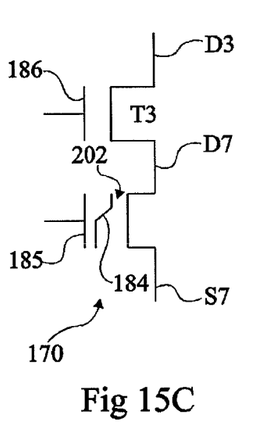

FIGS. 15A to 15C illustrate the forming of transistor 170 forming capacitive programming element C3. It is a standard EEPROM cell in which the extension 201 of the N doped area under tunnel window 202 (FIG. 15B) provides a platform in the charge injection area. Like a standard EEPROM cell, drain area D7 is connected to the source of selection transistor T3. Source area S7 is connected to terminal 112.

Figures 16A, 16B, 16C, 17A, 17B, 17C:
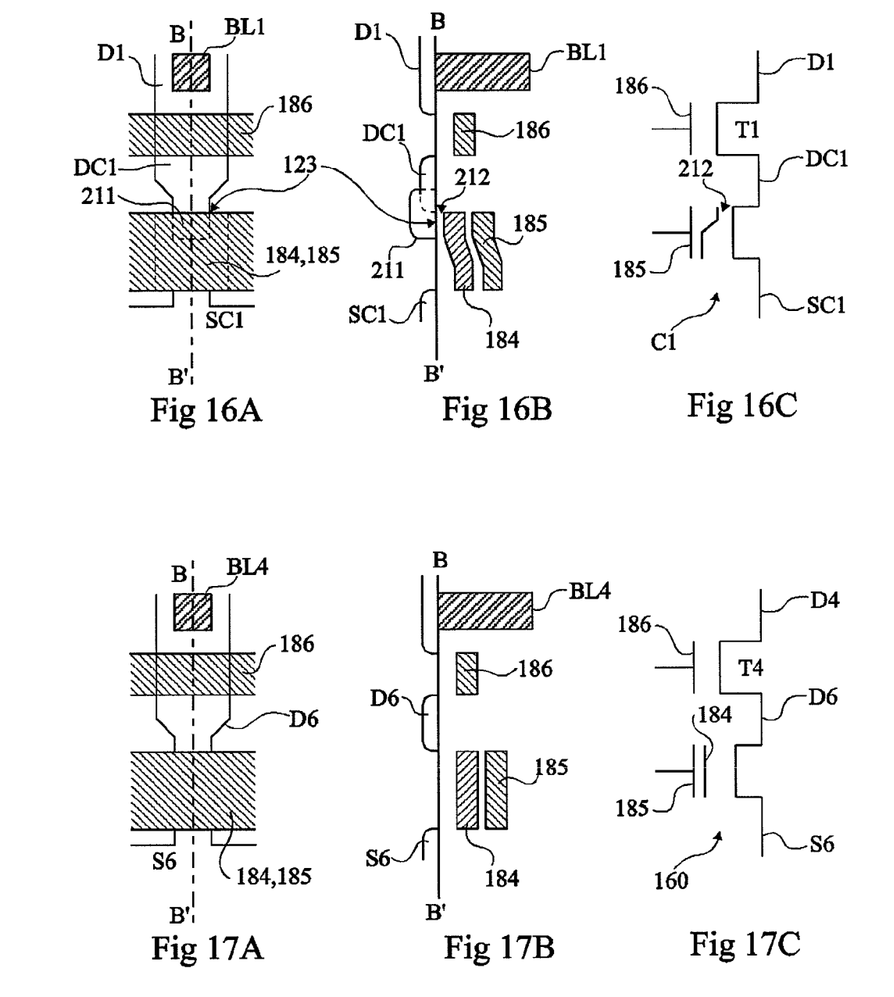
FIGS. 16A, 16B, and 16C respectively are a top view, a cross-section view along the second direction, and the equivalent electric diagram of a third element of the circuit of FIGS. 13A to 13C.
FIGS. 17A, 17B, and 17C respectively are a top view, a cross-section view along the second direction, and the equivalent electric diagram of a fourth element of the circuit of FIGS. 13A to 13C.

FIGS. 16A to 16C illustrate the forming of capacitive element C1 forming the leakage element of the charge retention circuit. As compared with a standard EEPROM cell, a difference is the thinning (area 212, FIG. 16B) of the dielectric window used for the tunnel effect to increase leakages. For example, dielectric thickness 212 is selected to be approximately half (for example, between 30 and 40 angstroms) that (for example, between 70 and 80 angströms) of a tunnel window (202, FIG. 15B) of an unmodified cell.

FIGS. 17A to 17C illustrate the forming of read transistor 160 in which the tunnel window has been eliminated as well as, preferably, the usual implanted area (201, FIG. 15B) of an EEPROM cell. The active area limited by source S6 and drain D6 is thus similar to that of a normal MOS transistor.

The representations of FIGS. 13A to 17C are simplified and may be adapted to the technology used. In particular, the gates have been shown as aligned with the limits of the drain and source areas, but a slight overlapping is often present.

An advantage of the embodiment by means of an EEPROM cell technology is that the charge retention circuit may be programmed and reset by applying the same voltage levels and the same time windows as those used to erase or write into EEPROM cells.

Another advantage is that this preserves a stability along time by avoiding the degradations of the thin oxide of the leakage element (C1) in successive write operations.

The respective connections of bit lines BL1 to BL4 depend on the circuit operating phases and especially on the programming (activation) or read phase.

Table I hereabove illustrates an embodiment of an activation (SET) and of a reading (READ) of an electronic charge retention circuit such as illustrated in FIGS. 13A to 17C.

TABLE I

|  | SEL | CG | BL2 | BL3 | BL1 | BL4 | 112 |
| --- | --- | --- | --- | --- | --- | --- | --- |
| SET | $VPP_1$ | 0 | HZ | $VPP_2$ | HZ | HZ | HZ |
| READ | $V_{SEL}$ | $V_{READ}$ | HZ | HZ | HZ | $V_{114}$ | 0 |

Figure 13C:
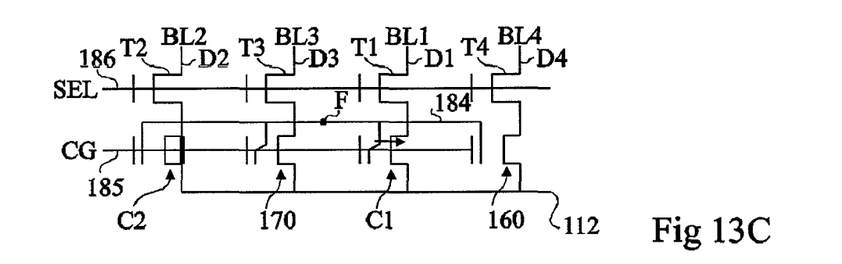

In an activation phase SET (switching of the stored bit to state 1), selection signal SEL is brought to a first high voltage $VPP_1$ with respect to ground to turn on the different transistors T1 to T4 while signal CG applied on the control gates of the floating-gate transistors remains at low level 0 to avoid turning on transistor 160. Bit lines BL1, BL2, and BL4 remain floating (high-impedance state HZ) while bit line BL3 is applied a positive voltage $V_{PP2}$ enabling charge of floating node F. Line 112, common to the sources of the floating-gate transistors, is preferentially left floating HZ.

For reading READ, the different selection transistors are set by signal SEL to a level $V_{SEL}$ and a read voltage $V_{READ}$ is applied on the control gates of the different floating-gate transistors. Lines BL1, BL2, and BL3 are in a high impedance state HZ while line BL4 receives a voltage $V_{114}$ enabling supplying the read current source. Line 112 is here grounded.

The relations between the different levels $VPP_1$, $VPP_2$, $V_{SEL}$, $V_{READ}$, and $V_{114}$ are, preferably, the following:

$VPP_1$ greater than $VPP_2$;

$V_{SEL}$ greater than $V_{READ}$;

$V_{READ}$ on the same order of magnitude as $V_{114}$.

According to a specific example of embodiment:

$VPP_1$=14 volts;

$VPP_2$=12 volts;

$V_{SEL}$=4 volts;

$V_{READ}$=2 volts; and $V_{114}$=1 volt.

What has been described hereabove in relation with one EEPROM cell per element of the charge retention circuit may of course be replaced with a structure in which subsets of several identical cells in parallel are used for the different respective elements. In particular:

several elements C2 may be used in parallel to increase the capacitance of node F to increase the electronic circuit discharge time;

several elements 170 may be used in parallel to increase the electron injection or extraction speed at node F in a programming;

several leakage elements C1 may be used in parallel to decrease the system discharge time; and/or several read elements 160 may be introduced in parallel to provide a greater current on evaluation of the circuit.

An electronic charge retention circuit may be introduced in any position of a standard network of EEPROM cells, which enables making it more difficult to locate by a possible evil-disposed user.

The cell-selection transistors forming the charge retention transistors may be shared with normal EEPROM cells on the same bit lines, by providing adapted addressing and switching means.

Of course, the present invention is likely to have various alterations, modifications, and improvements which will readily occur to those skilled in the art. In particular, the charge retention circuit may be formed by any circuit capable of providing, in reproducible fashion, a charge loss along time independently from the circuit power supply. For example, a circuit such as described in International patent application WO-A-03/083769 may be used.

Further, the practical forming of the circuit based on the functional indications given hereabove and on the needs of the application is within the abilities of those skilled in the art. The counters may be of any nature and the counting function may be of any increment or decrement. For example (especially in embodiments, for example FIG. 8 et seq., where the counting cells cannot be reset otherwise than by time), two incremental counters of finite size, the difference of which provides the value to be considered, may be used.

Moreover, especially as it requires no permanent power supply, the present invention may be implemented in contactless devices (of electromagnetic transponder type) which draw their power supply from an electromagnetic field in which they are present (generated by a terminal).

Finally, all that has been described in relation with a counter increment easily transposes to a counter decrement for each detection.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for controlling the access to at least one resource of an electronic circuit, wherein a test of a value of a counter over at least one bit conditions the access to the resource, the counter being automatically reset after a time period independent from whether the electronic circuit is powered or not, and being provided in the form of at least one charge retention circuit comprising at least one first capacitive element exhibiting a leakage through its dielectric space, wherein a switching of a bit of said counter to an active state is caused by an injection or extraction of charges into or from said first capacitive element.

2. The method of claim 1, wherein said counter is incremented or decremented on each access to the resource.

3. The method of claim 1, wherein said counter is over several bits, a result of said test being provided directly by the state of one of the bits.

4. The method of claim 1, wherein the access to said resource is blocked in case of a detection of a number of past accesses greater than a threshold, the blocking being definitive or temporary, of a duration independent from whether the circuit is powered or not.

5. The method of claim 4, wherein the blocking duration ranges between one day and three months.

6. The method of claim 1, wherein the counter is set at the first access to the resource.

7. The method of claim 1, applied to limiting the frequency of use of a secret quantity of the circuit.

8. The method of claim 7, applied to the protection of the secret quantity.

9. The method of claim 1, applied to the control of the access to a resource of the circuit enabling exploiting the content of another support.

10. The method of claim 1, applied to the providing of temporary authorizations of use of a program or of data.

11. An electronic circuit comprising a processor and a memory containing instructions configured to implement the method of claim 1.

12. The circuit of claim 11, wherein the charge retention circuit comprises:
   the at least one first capacitive element having a first electrode connected to a floating node;
   at least one second capacitive element having a first electrode connected to said floating node, the second capacitive element having a greater capacitance than the first one; and
   at least one first transistor with an insulated control gate connected to said floating node.

13. The circuit of claim 12, wherein at least one third capacitive element has a first electrode connected to said floating node and a second electrode connectable to a voltage source.

14. The circuit of claim 13, implanted in an array of EEPROM-type memory cells each comprising a selection transistor is in series with a floating-gate transistor, wherein on a same row of memory cells where the respective floating gates of the cell transistors are interconnected:
   the first capacitive element comprises a first subset of at least one first cell where the thickness of the dielectric of the tunnel window of the floating gate transistor is smaller than that of the other cells;
   the second capacitive element comprises a second subset of at least one second cell where the drain and the source of the floating-gate transistor are interconnected;
   the third capacitive element comprises a third subset of at least one third cell; and
   the first transistor comprises a fourth subset of at least one fourth cell having its tunnel window eliminated.

15. A method for controlling access to a resource of an electronic circuit, comprising:
   testing a value of a counter of at least one bit in response to receiving a request to access the resource, the counter comprising at least one charge retention circuit including at least one first capacitive element having a leakage that discharges the first capacitive element to an inactive state at the end of a time period that is independent of whether power is applied to the electronic circuit;
   initiating a countermeasure in response to the value of the counter being at a limit;
   incrementing or decrementing the counter toward the limit in response to the value of the counter not being at the limit; and
   enabling access to the resource in response to the value of the counter not being at the limit.

16. A method as defined in claim 15, wherein incrementing or decrementing the counter comprises switching a bit of the counter to an active state by injection or extraction of charges into or from the first capacitive element.

17. A method as defined in claim 15, wherein the limit is zero and wherein incrementing or decrementing the counter comprises decrementing the counter toward zero.

18. A method as defined in claim 15, wherein the limit is a threshold and wherein incrementing or decrementing the counter comprises incrementing the counter toward the threshold.

19. A method as defined in claim 15, wherein initiating a countermeasure comprises initiating a blocking of access to the resource.

20. A method as defined in claim 15, wherein the counter includes several bits and wherein testing comprises reading a highest order bit of the counter.

21. A method as defined in claim 15, wherein the at least one first capacitive element has a first electrode connected to a floating node and wherein the at least one charge retention circuit further comprises at least one second capacitive element having a first electrode connected to the floating node, the second capacitive element having a larger capacitance and a smaller leakage then the first capacitive element, and a measurement circuit connected to the floating node to measure a residual charge of the floating node.

22. A method as defined in claim 15, wherein the counter automatically resets to the inactive state at the end of the time period.

23. An electronic circuit comprising:
a counter comprising at least one charge retention circuit including at least one first capacitive element having a leakage that discharges the first capacitive element to an inactive state at the end of a time period that is independent of whether power is applied to the electronic circuit; and
a controller configured to:
test a value of the counter in response to receiving a request to access a resource;
initiate a countermeasure in response to the value of the counter being at a limit;
increment or decrement the counter toward the limit in response to the value of the counter not being at the limit; and
enable access to the resource in response to the value of counter not being at the limit.

24. An electronic circuit as defined in claim 23, wherein the counter is configured for switching of a bit to an active state by injection or extraction of charges into or from the first capacitive element.

25. An electronic circuit as defined in claim 23, wherein the controller is configured to initiate the countermeasure by initiating a blocking of access to the resource.

26. An electronic circuit as defined in claim 23, wherein the counter has several bits and wherein the test comprises reading a highest order bit of the counter.

27. An electronic circuit as defined in claim 23, wherein the at least one first capacitive element has a first electrode connected to a floating node, and wherein the at least one charge retention circuit further comprises at least one second capacitive element having a first electrode connected to the floating node, the second capacitive element having a larger capacitance and a smaller leakage than the first capacitive element, and a measurement circuit connected to the floating node to measure a residual charge of the floating node.

28. An electronic circuit as defined in claim 27, wherein the at least one charge retention circuit further comprises at least one third capacitive element having a first electrode connected to the floating node and a second electrode connectable to a voltage source.

29. An electronic circuit as defined in claim 27, wherein the measurement circuit includes a floating gate transistor having a floating gate connected to the floating node.

30. An electronic circuit as defined in claim 23, wherein the counter automatically resets to the inactive state at the end of the time period.

* * * * *